United States Patent
Chao et al.

(10) Patent No.: US 8,923,294 B2
(45) Date of Patent: Dec. 30, 2014

(54) DYNAMICALLY PROVISIONING MIDDLEBOXES

(75) Inventors: H. Jonathan Chao, Holmdel, NJ (US); Kang Xi, Morganville, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 573 days.

(21) Appl. No.: 13/171,119

(22) Filed: Jun. 28, 2011

(65) Prior Publication Data
US 2013/0003735 A1 Jan. 3, 2013

(51) Int. Cl.
| | |
|---|---|
| H04L 12/28 | (2006.01) |
| H04L 12/56 | (2006.01) |
| G06F 15/16 | (2006.01) |
| G06F 15/173 | (2006.01) |
| H04L 29/08 | (2006.01) |
| H04L 12/723 | (2013.01) |
| H04L 12/721 | (2013.01) |

(52) U.S. Cl.
CPC .............. *H04L 45/50* (2013.01); *H04L 67/327* (2013.01); *H04L 45/66* (2013.01)
USPC ...... 370/392; 370/389; 370/395.31; 709/202; 709/238; 709/239; 709/240; 709/245

(58) Field of Classification Search
USPC ......................................................... 370/392
See application file for complete search history.

(56) References Cited

U.S. PATENT DOCUMENTS

| | | | |
|---|---|---|---|
| 2007/0195793 A1* | 8/2007 | Grosser et al. | 370/395.53 |
| 2007/0201490 A1* | 8/2007 | Mahamuni | 370/395.54 |
| 2007/0239886 A1* | 10/2007 | Montemayor et al. | 709/232 |
| 2009/0252134 A1* | 10/2009 | Schlicht et al. | 370/338 |

OTHER PUBLICATIONS

S. Y. Choi and J. Turner, "Configuring Sessions in Programmable Networks with Capacity Constraints," *Department of Computer Science Washington University* (May 2003).

A. Greenberg, et al., "Public Review for A Clean Slate 4D Approach to Network Control and Management," *ACM SIGCOMM Computer Communication Review*, vol. 35, No. 5, pp. 41-54 (Oct. 2005).

"Configuration Management: Best Practices White Paper," (Cisco Systems, Inc., 2007).

"Network Configuration Management," pp. 1-16 (Cisco Systems, Inc., 2007).

(Continued)

*Primary Examiner* — Noel Beharry
(74) *Attorney, Agent, or Firm* — John C. Pokotylo; Straub & Pokotylo

(57) ABSTRACT

Hybrid security architecture (HSA) provides a platform for middlebox traversal in the network. The HSA decouples the middlebox control from network forwarding. More specifically, such embodiments may receive a data packet having a packet header including an Ethernet header identifying source and destination addresses in the network. A traffic type of the data packet is determined. Then, layer-2 forwarding information, which encodes a set of non-forwarding network service provider middleboxes in the network to be traversed by the data packet, is determined based on the traffic type. The layer-2 forwarding information is inserted into the Ethernet header and the data packet is forwarded into the network. The data packet will then traverse, according to the layer-2 forwarding information, a sequence of the middleboxes in the network, wherein at least one non-forwarding network service will be provided by each of the middleboxes to the data packet in a sequence.

21 Claims, 9 Drawing Sheets

(56) References Cited

OTHER PUBLICATIONS

M. Casado, et al., "Ethane: Taking Control of the Enterprise," *Proceedings of ACM SIGCOMM* (2007).
B. Raghavan, et al., "Secure and Policy-Complaint Source Routing," *IEEE/ACM Transactions on Networking* (2008).
X. Huang, "A Scalable Distributed Routing Protocol for Networks with Data-Path Services," pp. 318-327 (IEEE, 2008).
D. A. Joseph, et al., "A Policy-aware Switching Layer for Data Centers," *SIGCOMM'08*, pp. 51-62 (Aug. 17-22, 2008).
N. McKeown, et al, "OpenFlow: Enabling Innovation in Campus Networks," *ACM SIGCOMM Computer Communication Review*, vol. 38, No. 2, pp. 69-74 (Apr. 2008).
N. Gude, et al., "NOX: Towards an Operating System for Networks," *ACM SIGCOMM Computer Communication Review* vol. 38, Issue 3 (Jul. 2008).
F. Le, et al., "Detecting Network-Wide and Router-Specific Misconfigurations Through Data Mining," *IEEE/ACM Transactions on Networking*, vol. 17, No. 1, pp. 66-79 (Feb. 19, 2009).
A. Greenberg, et al., "VL2: A Scalable and Flexible Data Center Network," *SIGCOMM '09: Proceedings of the ACM SIGCOMM 2009 conference on Data communication*, pp. 51-62 (Aug. 17-21, 2009).
R. Niranjan Mysore, et al., "PortLand: A Scalable Fault-Tolerant Layer 2 Data Center Network Fabric," *In Proceedings of ACM SIGCOMM*, pp. 39-50 (Aug. 17-21, 2009).
M. Goldszmidt, et al., "Toward Automatic Policy Refinement in Repair Services for Large Distributed Systems," pp. 1-5 (2009).
Microsoft Corporation, "Securing Microsoft's Cloud Infrastructure" *Microsoft Global Foundation Services*, pp. 1-24 (May 2009).
L. Barroso and U. Hölzle, "The Datacenter as a Computer: An Introduction to the Design of Warehouse-Scale Machines," *Synthesis Lectures on Computer Architecture*, pp. 1-103 (2009).
Y. Chiba, et al., "Source Flow: Handling Millions of Flows on Flow-Based Nodes," *SIGCOMM'10*, pp. 465 & 466 (Aug. 30-Sep. 3, 2010).
"Cisco Virtual Security Gateway for Cisco Nexus 1000V Series Switches," (Cisco Systems, Inc, 2010).
J. Shafer, et al., "Axon: A Flexible Substrate for Source-routed Ethernet," *ANCS'10* (Oct. 25-26, 2010).
V. Soundararajan and J. Anderson, "The Impact of Management Operations on the Virtualized Datacenter, " *ISCA '10* (Jun. 19-23, 2010).
J. Lee, et al., "No More Middlebox: Integrate Processing into Network," *SIGCOMM'10* pp. 459-460 (Aug. 30-Sep. 3, 2010).
Loudhouse, "Mimecast: Cloud Barometer Survey 2010" pp. 1-15 (2010).
X. Meng, et al., "Improving the Scalability of Data Center Networks with Traffic-Aware Virtual Machine Placement," *IEEE INFOCOM* (2010).
F. Hao, et al., "Secure Cloud Computing with a Virtualized Network Infrastructure," *Proceedings of the 2nd USENIX conference on Hot topics*, pp. 1-7 (2010).
T. Jaeger and J. Schiffman, "Outlook Cloudy with a Chance of Security Challenges and Improvements," *IEEE Security & Privacy*, pp. 77-80 (Jan./Feb. 2010).
"Cisco Data Center Infrastructure 2.5 Design Guide, Cisco Validated Design," vol. 8, Issue 1 (Cisco Systems, Mar. 9, 2010).
"Cloud Computing Adoption Seeing Acceleration in Asia Pacific," http.//www.expresscomputeronline.com/20110110/news02.shtml (Jan. 2011).
"Cloud-Reference Data Center Reference Architecture," pp. 1-37 (Juniper Networks, 2011).
"Firewall & Router Configuration Review," *Pivot Point Security Inc.* (2011).
"FortiGate Virtual Appliances Multi-Treat Security for Virtual Environments," (Fortinet, 2010).
J. Dean, "Designs, Lesson and Advice from Building Large Distributed Systems" (Google).

\* cited by examiner

DYNAMICALLY PROVISIONING MIDDLEBOXES

§1. BACKGROUND OF THE INVENTION

§1.1 Field of the Invention

The present invention concerns middlebox traversal in a network such as a data center network. More specifically, the present invention concerns dynamic provisioning of middleboxes.

§1.2 Background Information

Data Center Networks (DCNs) are used to host an increasing variety of applications and services, and are growing to tens of thousands of machines. Middleboxes are used to provide services such as traffic monitoring, traffic engineering, traffic policing, network and system security enforcements, etc., in DCNs. Together with the booming market of cloud computing, there is a need for high performance, highly scalable and dynamic middlebox provisioning. While recent advances in DCN architecture address many issues such as scalability, latency, etc., a truly dynamic yet network-forwarding independent middlebox traversal platform does not yet exist.

Middlebox traversal is an important part of the DCN infrastructure. Traditionally, middleboxes are deployed "in-path" at network borders, such as at a gateway to the Internet or at the edge of a subnet, so that the middleboxes are always traversed. The increasing variety in DCN designs and host applications, however, make correct, scalable, flexible and resource efficient middlebox traversal a challenge.

Data centers have been growing constantly, reaching hundreds of thousands of servers in a single facility. (See, e.g., L. A. Barroso and U. Holzle, "The Datacenter as a Computer: An Introduction to the Design of Warehouse-Scale Machines," http://research.google.com/pubs/pub35290.html, (2009) (Accessed January 2010); J. Dean, "Designs, Lessons and Advice from Building Large Distributed Systems," http://www.cs.cornell.edu/projects/ladis2009/talks/dean-keynote-ladis2009.pdf, (2009) (Accessed January 2010); and T. Jaeger and J. Schiffman, "Outlook: Cloudy with a Chance of Security Challenges and Improvements," *Security Privacy, IEEE*, 8(1):77-80, (January-February 2010), each incorporated herein by reference.) It may be a challenge to scale up the middlebox system to keep up with the growth. Middleboxes at perimeters, or any small number of clusters, may experience a bottleneck as traffic converges at them. This is especially true with the emergence of cloud computing and cloud-based virtual desktop services.

A variety of applications from different clients introduces different demands. Instances of virtual machines (VMs) from different clients are hosted on a physically connected network, and, in some cases, the same physical machines. The notion of internal network and perimeter defense may no longer apply. (See, e.g., T. Jaeger and J. Schiffman, "Outlook: Cloudy with a Chance of Security Challenges and Improvements," *Security Privacy, IEEE*, 8(1):77-80, (January-February 2010), incorporated herein by reference.) Also, VMs are often migrated and care is needed when migrating their traffic and their security settings. (See, e.g., F. Hao, T. V. Lakshman, S. Mukherjee, and H. Song, "Secure Cloud Computing with a Virtualized Network Infrastructure," *Proceedings of the 2nd USENIX Conference on Hot Topics in Cloud Computing*, HotCloud'10, pages 16-16, Berkeley, Calif., USA, USENIX Association, (2010); T. Jaeger and J. Schiffman, "Outlook: Cloudy with a Chance of Security Challenges and Improvements," *Security Privacy, IEEE*, 8(1):77-80, (January-February 2010); and V. Soundararajan and J. M. Anderson, "The Impact of Management Operations on the Virtualized Datacenter," *Proceedings of the 37th Annual International Symposium on Computer Architecture*, ISCA '10, pages 326-337, New York, N.Y., USA, ACM 9, (2010), each incorporated herein by reference.)

However, one of the main concerns that enterprises may have are how various security and monitoring may be reliably ensured in a shared infrastructure. (See, e.g., Express Computer, "Cloud Computing Adoption Seeing Acceleration in Asia Pacific," http://www.expresscomputeronline.com/20110110/news02.shtml, (January, 2011) (Accessed January, 2011); T. Jaeger and J. Schiffman, "Outlook: Cloudy with a Chance of Security Challenges and Improvements," *Security Privacy, IEEE*, 8(1):77-80, (January-February 2010); and Loudhouse Research, *Cloud barometer survey* 2010, (July 2010); and Microsoft, "Securing Microsoft's Cloud Infrastructure," http://www.globalfoundationservices.com/security/documents/SecuringtheMSCloudMay09.pdf, (May 2009) (Accessed January 2010), each incorporated herein by reference.)

In traditional DCNs, middleboxes composed of specialized network appliances are often deployed in a few clusters between the Internet gateways and servers. (See e.g., Cisco Systems, Inc., "Cisco Data Center Infrastructure 2.5 Design Guide," http://www.cisco.com/en/US/docs/solutions/Enterprise/Data_Center/DC_Infra2_5/DCI_SRND.pdf, (March 2010); and Juniper Networks, Inc., "Cloud-Ready Data Center Reference Architecture, http://www.juniper.net/us/en/local/pdf/reference-architectures/8030001-en.pdf, (2010) (Accessed January 2010), both incorporated herein by reference.) The design is mainly to protect servers from external adversaries, which is the main current threat. However, as the perimeter fades with the introduction of server virtualization, network routing and forwarding may be tweaked to force intra data center traffic through middleboxes. For example, Virtual Local Area Network (VLAN) are widely used to partition the network into security domains (See, e.g., T. Jaeger and J. Schiffman, "Outlook: Cloudy with a Chance of Security Challenges and Improvements," *Security Privacy, IEEE*, 8(1):77-80, (January-February 2010); Loudhouse Research, *Cloud Barometer Survey* 2010, (July 2010); and Microsoft, "Securing Microsoft's Cloud Infrastructure," http://www.globalfoundationservices.com/security/documents/SecuringtheMSCloudMay09.pdf, (May 2009) (Accessed January 2010), each incorporated herein by reference.) such that traffic between domains are forced to traverse through all those middleboxes. The heavy reliance on custom configured network forwarding to provide middlebox traversal has serious drawbacks. Routing and forwarding configuration alone is already complex. (See, e.g., F. Le, S. Lee, T. Wong, H. S. Kim, and D. Newcomb, "Detecting Network-Wide and Router-Specific Misconfigurations Through Data Mining," *IEEE/ACM Trans. Netw.*, 17:66-79, (February 2009), incorporated herein by reference.) Adding security may make the configuration even more error prone. The complexity of configuration management is cited by the industry (See, e.g. Cisco, Configuration management, "Best Practices White Paper," http://www.cisco.com/application/pdf/paws/15111/configmgmt.pdf, (March 2007) (Accessed January 2010); and Cisco, "Network Configuration Management," http://www.cisco.com/en/US/technologies/tk869/tk769/technologies_white_paper0900aecd806c0d88.pdf, (September 2007) (Accessed January 2010), each incorporated herein by reference.) and there are specialized configuration auditing and management services. (See, e.g., Pivot Point Security, "Firewall and Router Configuration Review," http://www- .pivotpointsecurity.com/network-security-services/-firewall---router-configuration-reviews/, (Accessed: January 2010), incorporated herein by reference.) Also, security requirements may change on short notice, in both capacity and functionality. For instance, a denial of service (DoS) attack may cause the need for a new DoS filtering middlebox(es) and a surge in packet classifier capacity. Clusters of hardware lack the flexibility to respond and have a natural bottleneck of network scalability.

There are quite a number of recent proposals aimed at addressing the middlebox traversal issue. (See, e.g., N. Gude, T. Koponen, J. Pettit, B. Pfaff, M. Casado, N. McKeown, and S. Shenker, "NOX: Towards an Operating System for Networks," *SIGCOMM Comput. Commun. Rev.*, (2008); F. Hao, T. V. Lakshman, S. Mukherjee, and H. Song, "Secure Cloud Computing with a Virtualized Network Infrastructure," *Proceedings of the 2nd USENIX Conference on Hot Topics in Cloud Computing, HotCloud'10*, pages 16-16, Berkeley, Calif., USA, USENIX Association, (2010); D. A. Joseph, A. Tavakoli, and I. Stoica, "A Policy-Aware Switching Layer for Data Centers," *Proceedings of the ACM SIGCOMM 2008 Conference on Data Communication, SIGCOMM '08*, pages 51-62, New York, N.Y., USA, (2008); J. Lee, J. Tourrilhes, P. Sharma, and S. Banerjee, "No More Middlebox: Integrate Processing into Network," *Proceedings of the ACM SIGCOMM 2010 conference on SIGCOMM, SIGCOMM '10*, pages 459-460, New York, N.Y., USA, (2010); and N. McKeown, T. Anderson, H. Balakrishnan, G. Parulkar, L. Peterson, J. Rexford, S. Shenker, and J. Turner, "Openflow: Enabling Innovation in Campus Networks," *SIGCOMM Comput. Commun. Rev.*, (2008), each incorporated herein by reference.)

P-switch (See, e.g., D. A. Joseph, A. Tavakoli, and I. Stoica, "A Policy-Aware Switching Layer for Data Centers," *Proceedings of the ACM SIGCOMM 2008 Conference on Data Communication, SIGCOMM '08*, pages 51-62, New York, N.Y., USA, (2008), incorporated herein by reference.) introduces specialized switches that are connected to sets of middleboxes. While the P-switches are deployed in-path, the middleboxes are not. P-switches host a packet classifier to determine the sequence of middleboxes to be traversed. Packets are forwarded between a P-switch and those middleboxes directly connected to it in a zigzag manner according to the required traversal sequence. After all the required middleboxes are traversed, a packet continues its way along a normal data path. This way, middleboxes are indirectly connected to the data-path and packets are forwarded through the sequence of middleboxes deemed necessary by network policies. The P-switch provides many benefits.

Unfortunately, however, specialized switches are needed. Middleboxes deployment may still be partially limited to clusters of deployments at locations that have P-switches deployed. Unless wide-spread deployment of P-switches is realized, the full flexibility of deploying middleboxes anywhere in the network may not be achieved. Also, some network forwarding support may still be required. For instance, VLAN may need to be configured to force all inter-virtual machine (VM) traffic of different security domain to be out of a physical machine to be classified by the P-switch.

Proposals for next generation enterprise networks and DCNs (See, e.g., M. Casado, M. J. Freedman, J. Pettit, J. Luo, N. McKeown, and S. Shenker, "Ethane: Taking Control of the Enterprise," *SIGCOMM '07: Proc. of the 2007 Conf on Applicat., Technol., Architectures, and Protocols for Comput. Commun.*, New York, N.Y., USA, (2007); A. Greenberg, G. Hjalmtysson, D. A. Maltz, A. Myers, J. Rexford, G. Xie, H. Yan, J. Zhan, and H. Zhang, "A Clean Slate 4D Approach to Network Control and Management," *SIGCOMM Comput. Commun. Rev.*, 35(5), (2005); N. Gude, T. Koponen, J. Pettit, B. Pfaff, M. Casado, N. McKeown, and S. Shenker, "NOX: Towards an Operating System for Networks," *SIGCOMM Comput. Commun. Rev.*, (2008); and N. McKeown, T. Anderson, H. Balakrishnan, G. Parulkar, L. Peterson, J. Rexford, S. Shenker, and J. Turner, "Openflow: Enabling Innovation in Campus Networks," *SIGCOMM Comput. Commun. Rev.*, (2008), each incorporated herein by reference.) advocate distributed enforcement of security policies. In particular, NOX (See, e.g., N. Gude, T. Koponen, J. Pettit, B. Pfaff, M. Casado, N. McKeown, and S. Shenker, "NOX: Towards an Operating System for Networks," *SIGCOMM Comput. Commun. Rev.*, (2008).) consists of one or more controllers and a set of OpenFlow (See, e.g., N. McKeown, T. Anderson, H. Balakrishnan, G. Parulkar, L. Peterson, J. Rexford, S. Shenker, and J. Turner, "Openflow: Enabling Innovation in Campus Networks," *SIGCOMM Comput. Commun. Rev.*, (2008), each incorporated herein by reference.) switches deployed in DCNs to provide flexible flow-based routing.

OpenFlow switches perform up to 11-tuple packet classification and can cache flow-based forwarding information. The NOX controller maintains the whole set of network policies and global network knowledge for routing and programming the forwarding table of OpenFlow switches. With the powerful packet classification features in OpenFlow switches, NOX may be configured to realize not only middlebox traversal, but also flexible middlebox deployments and many of the network forwarding optimizations such as multipath routing. In fact, OpenFlow switches may be a fully functional agent as it provides both packet classification and header rewriting features. However, inter-VM traffic on the same machine may not be protected unless network forwarding tricks like VLAN separation is used. The fact that specialized switches are required may also be undesirable.

Two recent proposals (See, e.g., F. Hao, T. V. Lakshman, S. Mukherjee, and H. Song, "Secure Cloud Computing with a Virtualized Network Infrastructure," *Proceedings of the 2nd USENIX Conference on Hot Topics in Cloud Computing, HotCloud'10*, pages 16-16, Berkeley, Calif., USA, USENIX Association, (2010); and J. Lee, J. Tourrilhes, P. Sharma, and S. Banerjee, "No More Middlebox: Integrate Processing into Network," *Proceedings of the ACM SIGCOMM 2010 conference on SIGCOMM, SIGCOMM '10*, pages 459-460, New York, N.Y., USA, (2010).) use programmable switches, such as OpenFlow switches, to steer traffic to specific middleboxes. The article J. Lee, J. Tourrilhes, P. Sharma, and S. Banerjee, "No More Middlebox: Integrate Processing into Network," *Proceedings of the ACM SIGCOMM 2010 conference on SIGCOMM, SIGCOMM '10*, pages 459-460, New York, N.Y., USA, (2010), middleboxes are connected to the programmable switches (Forwarding Element, or FE) similar to P-switch. VLAN are used to separate hosts of different security domains such that cross domain traffic is forced through FEs, where policies are enforced. A centralized controller is used in a similar manner as OpenFlow in that forwarding tables in FEs can be pre-populated while the misses cached after querying the centralized controller.

There are approaches based on source routing (See, e.g., Y. Chiba, Y. Shinohara, and H. Shimonishi, "Source Flow: Handling Millions of Flows on Flow-Based Nodes," *SIGCOMM Comput. Commun. Rev.*, 40:465-466, (August 2010); B. Raghavan, P. Verkaik, and A. C. Snoeren, "Secure and Policy-Compliant Source Routing," *IEEE/ACM Trans. Netw.*, 17:764-777, (June 2009); and J. Shafer, B. Stephens, M. Foss, S. Rixner, and A. L. Cox, "Axon: A Flexible Substrate for Source-Routed Ethernet," *Proceedings of the 6th ACM/IEEE Symposium on Architectures for Networking and Communications Systems, ANCS '10, pages 22:1-22:11, New York, N.Y., USA, (2010), each incorporated herein by reference.) similar with many of the above proposals in that packets are classified at the source or originating edge to determine the path. Source-based routing can be used to deploy the required middleboxes in-path. One important difference is the header size increases with the number of hops and middleboxes. Intermediate switches may have to be changed to support relaying based on the source routing header tags.

DCNs are special in that there are a variety of architectures tailored for specific data centers demands. There are reference designs by equipment vendors (See, e.g., Cisco Systems, Inc., "Cisco Data Center Infrastructure 2.5 Design Guide," http://www.cisco.com/en/US/docs/solutions/Enterprise/ Data_Center/DC_Infra2_5/DCI_SRND.pdf, (March 2010); and Juniper Networks, Inc., "Cloud-Ready Data Center Reference Architecture, http://www.juniper.net/us/en/local/pdf/ reference-architectures/8030001-en.pdf, (2010) (Accessed January 2010), both incorporated herein by reference.), new architectures proposed by academia (See, e.g. A. Greenberg, J. R. Hamilton, N. Jain, S. Kandula, C. Kim, P. Lahiri, D. A. Maltz, P. Patel, and S. Sengupta, "VL2: A Scalable and Flexible Data Center Network," *SIGCOMM '09: Proceedings of the ACM SIGCOMM 2009 Conference on Data Communication*, pages 51-62, New York, N.Y., USA, (2009); and R. Niranjan Mysore, A. Pamboris, N. Farrington, N. Huang, P. Miri, S. Radhakrishnan, V. Subramanya, and A. Vahdat, "Portland: A Scalable Fault-Tolerant Layer 2 Data Center Network Fabric," *SIGCOMM '09: Proceedings of the ACM SIGCOMM 2009 Conference on Data Communication*, pages 39-50, New York, N.Y., USA, (2009)), custom design from major operator like Google (See, e.g., L. A. Barroso and U. Hölzle, "The Datacenter as a Computer: An Introduction to the Design of Warehouse-Scale Machines," http://research-.google.com/pubs/pub35290.html, (2009) (Accessed January 2010), incorporated herein by reference.) etc. The existing middlebox traversal schemes are not independent from the network forwarding configuration and mechanisms. For example, configuration and changes in routing, load balancing, traffic engineering in network forwarding typically causes reconfiguration of the middlebox traversal system, and vice versa.

Recent literature on DCN architectures such as VL2 (See, e.g., A. Greenberg, J. R. Hamilton, N. Jain, S. Kandula, C. Kim, P. Lahiri, D. A. Maltz, P. Patel, and S. Sengupta, "VL2: A Scalable and Flexible Data Center Network," *SIGCOMM '09: Proceedings of the ACM SIGCOMM 2009 conference on Data communication*, pages 51-62, New York, N.Y., USA, (2009)) and Portland (See, e.g., R. Niranjan Mysore, A. Pamboris, N. Farrington, N. Huang, P. Miri, S. Radhakrishnan, V. Subramanya, and A. Vahdat, "Portland: A Scalable Fault-Tolerant Layer 2 Data Center Network Fabric," *SIGCOMM '09: Proceedings of the ACM SIGCOMM 2009 Conference on Data Communication*, pages 39-50, New York, N.Y., USA, (2009).) often call for more at layer-2 topology. The emphasis may be on large bisectional bandwidth, improved network scalability, low latency, facilitation of VM migration, etc. However, a traditional centralized perimeter for security enforcement works against this design principle. Operators should be able to deploy multiple types and instances of middleboxes at any location in a network, to improve scalability of network resources through proximity (See, e.g., X. Meng, V. Pappas, and L. Zhang, "Improving the Scalability of Data Center Networks with Traffic-Aware Virtual Machine Placement," *Proceedings of the 29th Conference on Information Communications*, INFOCOM '10, pages 1154-1162, Piscataway, N.J., USA, IEEE Press, (2010), incorporated herein by reference.), for example.

Churn in application type and network services may require rapid on-demand scaling of network services, including firewall, deep packet inspection (DPI), traffic engineering, load balancing, etc. Suppose a client deployed a new web service in a cloud-based data center and traffic had been low during development and evaluation. If the web service goes public and becomes well publicized, a sudden surge of traffic may demand additional firewall and DPI capacity. As more cloud instances are added, a load balancer may have to be added to the sequence of middlebox traversal. Unfortunately, the churn in the traffic loads has to be responded by enormous over-provisioning for a highly unpredictable demand, given the nature of cloud paradigm.

Operational costs for human intervention are very expensive. (See, e.g., M. Goldszmidt, M. Budiu, Y. Zhang, and M. Pechuk, "Toward Automatic Policy Refinement in Repair Services for Large Distributed Systems," *SIGOPS Oper. Syst. Rev.*, 44:47-51, (April 2010), incorporated herein by reference.) There are quite a number of day-to-day operations that may require some manual operations, such as changes in network policy and configuration, link reconfiguration, hardware installation etc. (See, e.g., J. Dean, "Designs, Lessons And Advice From Building Large Distributed Systems," http://www.cs.cornell.edu/projects/ladis2009/talks/dean-keynote-ladis2009.pdf, (2009), (Accessed January 2010); and V. Soundararajan and J. M. Anderson, "The Impact of Management Operations on the Virtualized Datacenter," *Proceedings of the 37th Annual International Symposium on Computer Architecture*, ISCA '10, pages 326-337, New York, N.Y., USA, ACM 9, (2010), both incorporated herein by reference.) With the scale of data center that may exceed tens of thousand of servers, switches and middleboxes, daily equipment failures are typical. (See, e.g., J. Dean, "Designs, Lessons And Advice From Building Large Distributed Systems," http://www.cs.cornell.edu/projects/ladis2009/talks/ dean-keynote-ladis2009.pdf, (2009), (Accessed January 2010).) Little margin for error may remain for other operations that could or must be automated. For instance, a data center with virtualization may have over 3000 automated live VM migrations per day. (See, e.g., V. Soundararajan and J. M. Anderson, "The Impact of Management Operations on the Virtualized Datacenter," *Proceedings of the 37th Annual International Symposium on Computer Architecture*, ISCA '10, pages 326-337, New York, N.Y., USA, ACM 9, (2010), incorporated herein by reference.) Network services, including middlebox traversal, may migrate with them. Requiring manual operations to correctly and efficiently enforce middlebox traversal upon frequent and automated events may be either inefficient or impossible.

In view of the foregoing, it would be useful to provide a middlebox provisioning scheme that: (i) decouples network services and network forwarding; (ii) facilitates dynamic deployment of hybrid (hardware and software) middleboxes anywhere in the network; (iii) provides dynamic scalability; and/or (iv) allows a high degree of automation in managing and operating the middleboxes.

§2. SUMMARY OF THE INVENTION

Exemplary embodiments consistent with the present invention may provision middleboxes in a network dynamically. Such exemplary embodiments may do so by (i) receiving, by an agent, a data packet having a payload and a packet header including an Ethernet header identifying a source address and a destination address in the network; (ii) determining, with the agent and using at least one of the packet header and the payload, a traffic type of the data packet; (iii) selecting, with the agent and based on the traffic type determined, layer-2 forwarding information which encodes a set of one or more non-forwarding network service provider middleboxes in the network to be traversed by the data packet; (iv) inserting, with the agent, the layer-2 forwarding information into the Ethernet header to generate a modified Ethernet header; and (v) forwarding, with the agent and using the layer-2 forwarding information, the data packet having the modified Ethernet header to the network, such that the data packet will then traverse one or more middleboxes, wherein a non-forwarding network service will be provided by each of the one or more middleboxes on the data packet in a sequence.

In at least some exemplary embodiments consistent with the present invention, the agent receives the data packet from a source host in the network and the act of receiving the data packet from the source host includes (i) requesting, with the source host and using a unicast Address Resolution Protocol (ARP), from an ARP server in the network, a media access control (MAC) address of a destination host to which the data packet is directed in the network, (ii) sending, with the ARP server and responsive to the request, a MAC address of the agent to the source host, (iii) updating, with the source host, the destination address in the Ethernet header of the data packet to the MAC address of the agent, and (iv) forwarding, with the source host, the data packet to the agent.

In at least some exemplary embodiments consistent with the present invention, performing the non-forwarding network service provided by each of the one or more middleboxes on the data packet in a sequence includes (i) obtaining, using the layer-2 forwarding information, a MAC address of next one of the one or more middleboxes in the sequence to be traversed, (ii) updating the destination address in the modified Ethernet header of the data packet to the MAC address of the next one of the one or more middleboxes to be traversed to generate an update modified Ethernet header, and (iii) forwarding the data packet, using the destination address in the updated modified Ethernet header, to the next one of the one or more middleboxes in the sequence to perform the non-forwarding network service provided by the next one of the one or more middleboxes.

In at least some exemplary embodiments consistent with the present invention, performing the non-forwarding network service provided by each of the one or more middleboxes on the data packet in a sequence further includes (i) determining if a current middlebox is a last middlebox in the sequence to be traversed, (ii) responsive to a determination that the current middlebox is the last middlebox in the sequence, obtaining a MAC address of a destination host to which the data packet is to be transmitted, (iii) updating the destination address of the modified Ethernet header to the MAC address of the destination host, (iv) removing the layer-2 forwarding information from the modified Ethernet header to obtain original Ethernet header, and (v) forwarding the data packet including the original Ethernet header to the destination host.

§3. BRIEF DESCRIPTION OF THE DRAWINGS

Figure 3A:
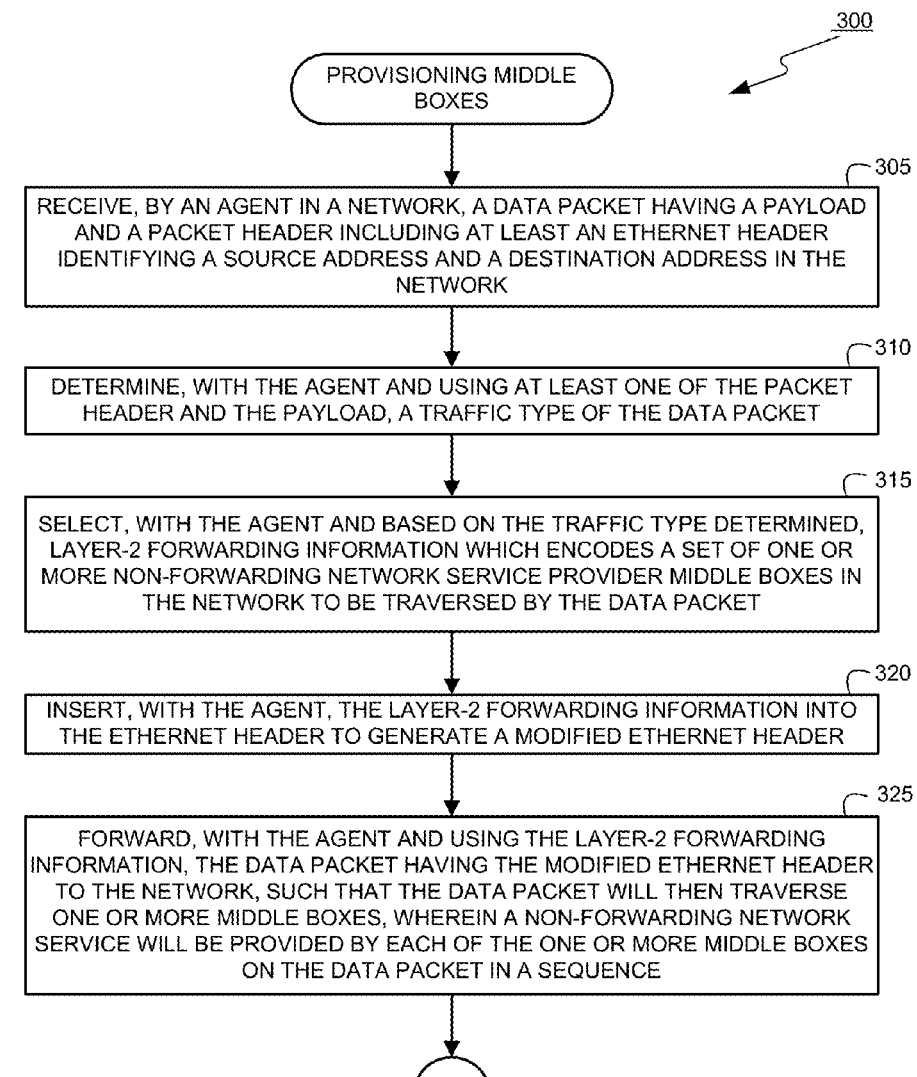
Figure 3B:
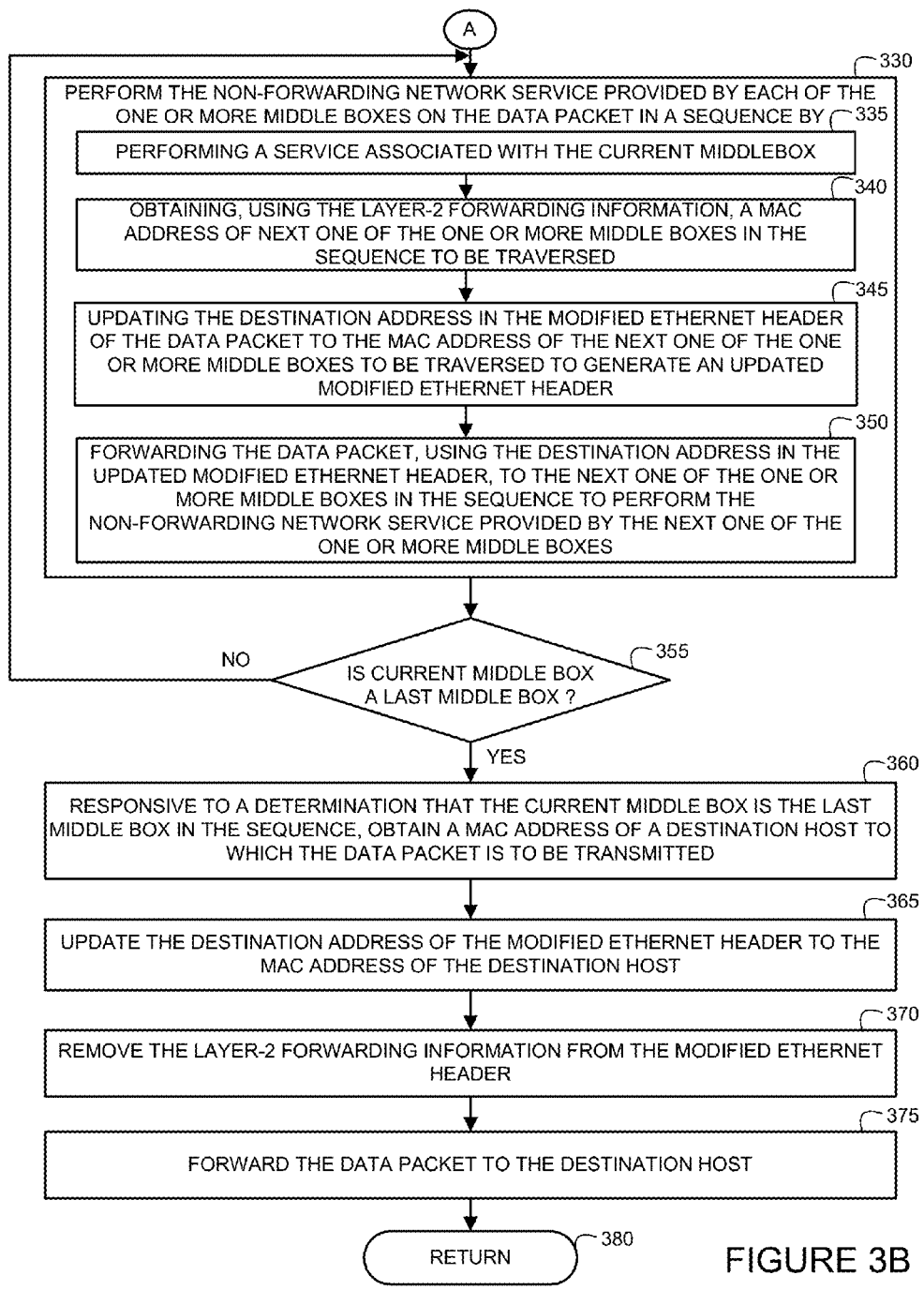

FIG. 3, which includes FIGS. 3A and 3B, is a flow diagram of an exemplary method for dynamically provisioning middleboxes in a network, in a manner consistent with the present invention.

Figure 4:
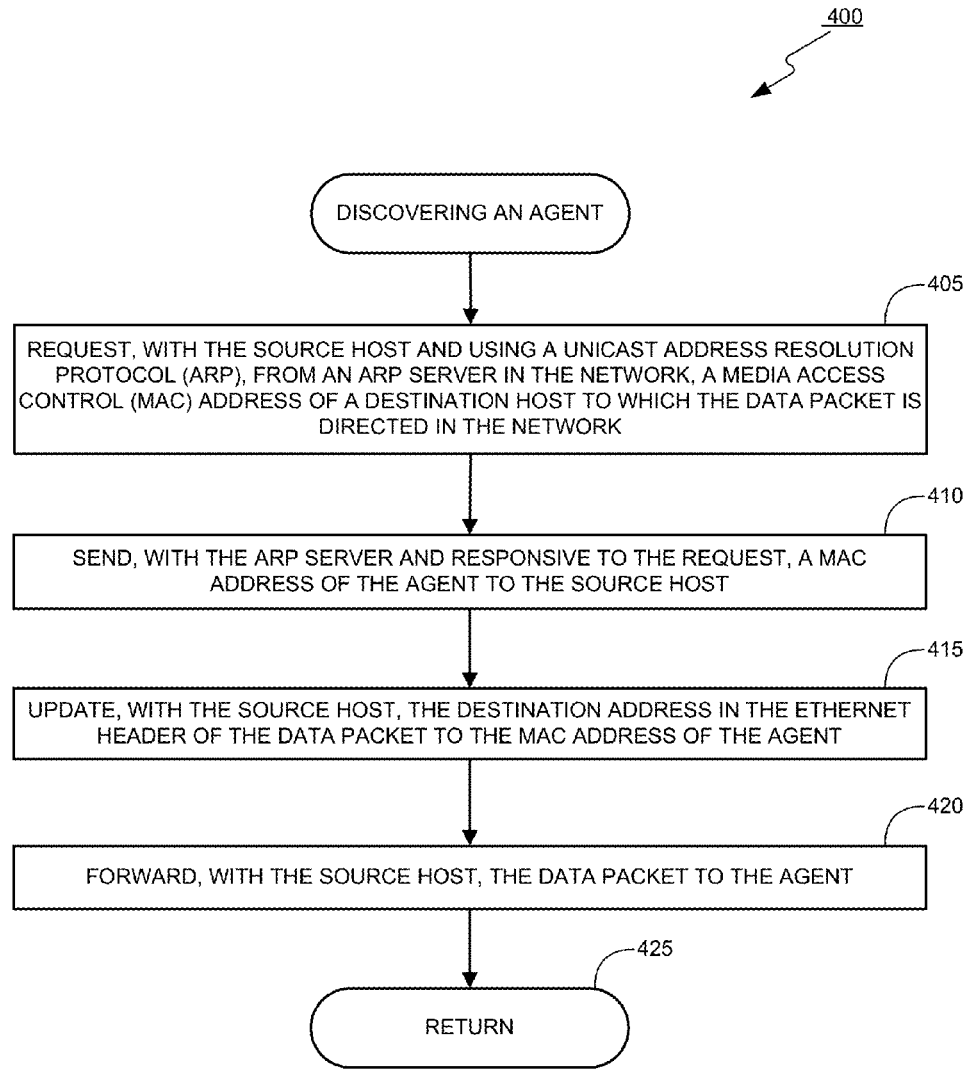

FIG. 4 is a flow diagram of an exemplary method for discovering an agent in the network, in a manner consistent with the present invention.

Figure 5:
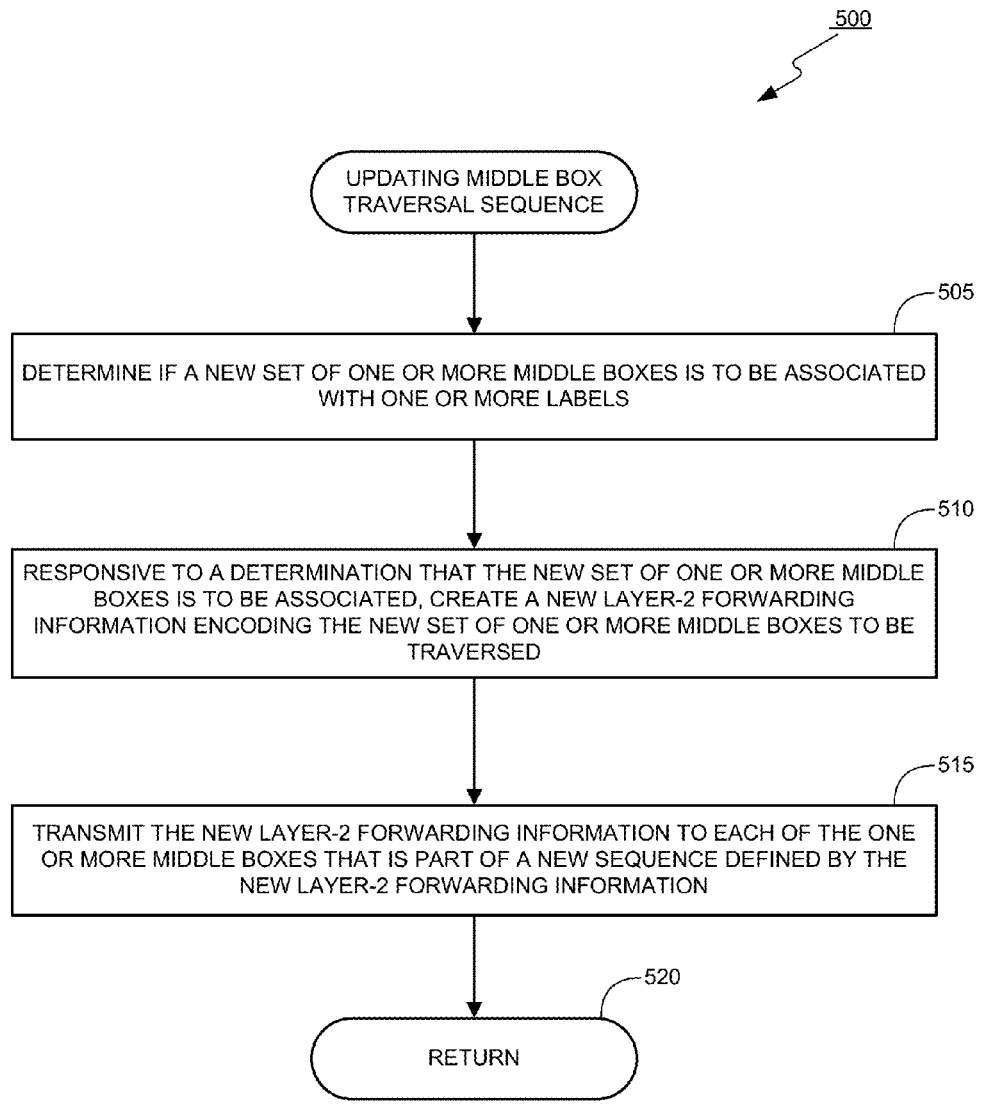

FIG. 5 is a flow diagram of an exemplary method for updating middlebox traversal sequence, in a manner consistent with the present invention.

Figure 6:
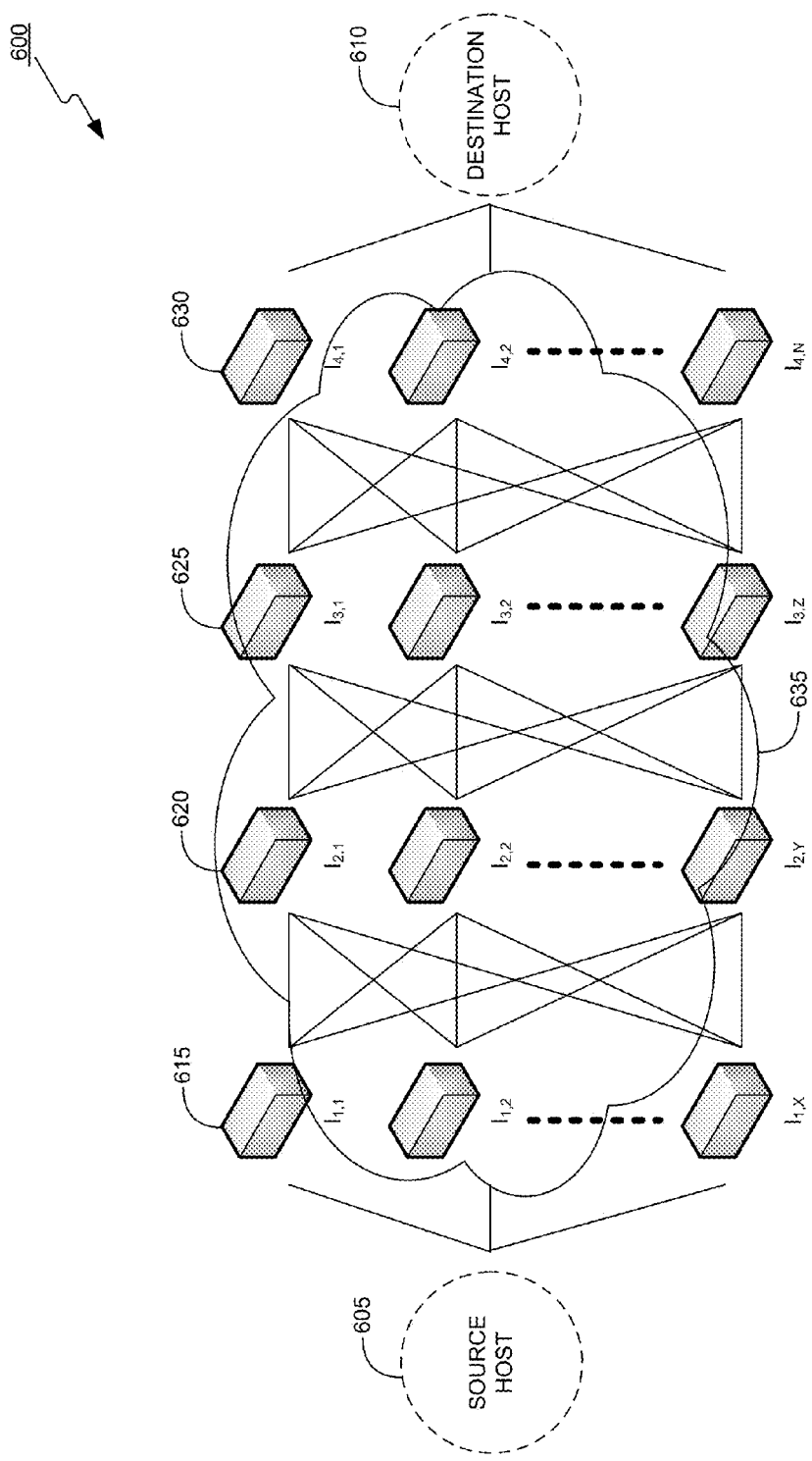

FIG. 6 illustrates a "graph" of middleboxes in an exemplary network.

Figure 7:
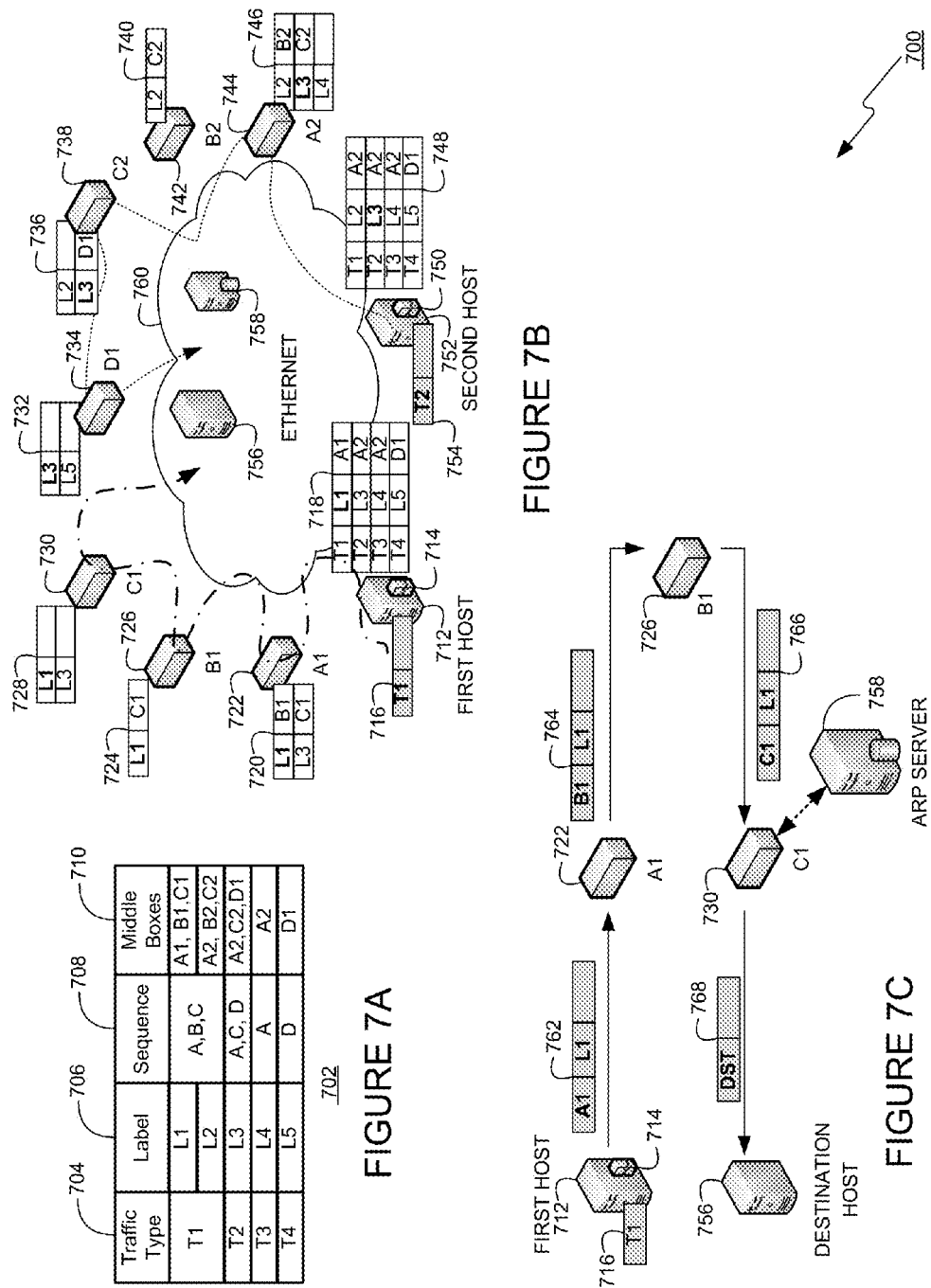

FIGS. 7A, 7B and 7C provide an example illustrating exemplary middleboxes provisioning in a network, in a manner consistent with the present invention.

Figure 8:
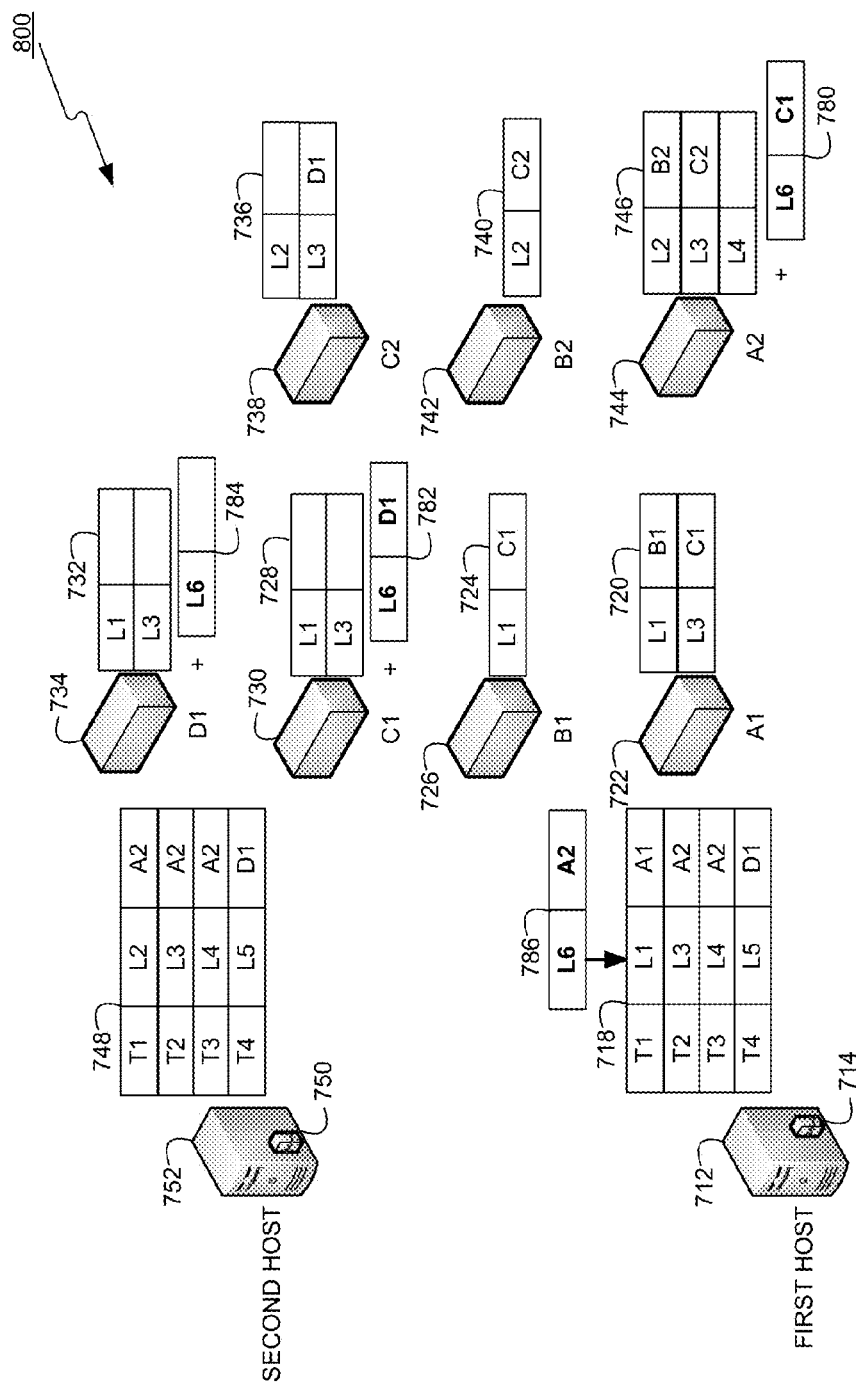

FIG. 8 provides an example illustrating exemplary creation of a new middlebox traversal sequence in the context of the middleboxes provisioned in FIGS. 7A-7C, in a manner consistent with the present invention.

§4. DETAILED DESCRIPTION

The present invention may involve novel methods, apparatus, message formats, and/or data structures for provisioning middleboxes in a network dynamically. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 EXEMPLARY ENVIRONMENT

Figure 1:
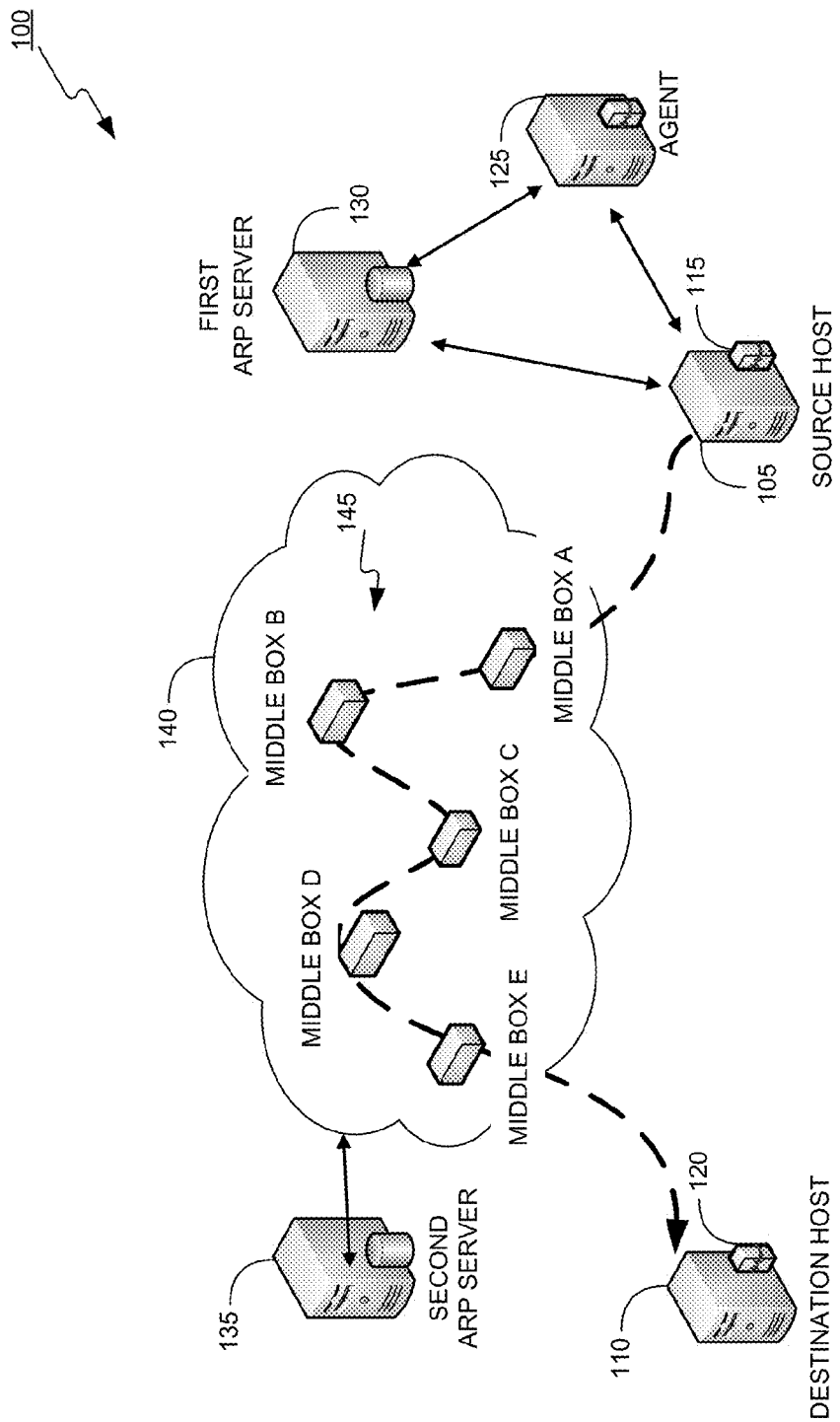
FIG. 1 illustrates an exemplary environment in which the present invention may operate.

FIG. 1 illustrates an exemplary environment 100 in which embodiments consistent with the present invention may operate. As shown, the environment 100 (which may be provided as hybrid security architecture (HSA)) includes a source host 105, destination host 110, an agent 125, a set of middleboxes 145 in a network 140, a first Address Resolution Protocol (ARP) server 130, and a second ARP server 135. One or more of the middleboxes, namely, middlebox A, middlebox B, middlebox C, middlebox D and middlebox E in the set of middleboxes 145 provide a non-forwarding network service to a data packet (not shown) traversing the network 140 from the source host 105 to the destination host 110. When the agent 125 receives a data packet, it assigns to the data packet, layer-2 forwarding information which encodes a set of one or more middleboxes in the set of middleboxes 145 to be traversed, based on a traffic type of the data packet. The data packet traverses one or more middleboxes in the set of middleboxes 145 according to the layer-2 forwarding information.

In an exemplary embodiment consistent with the present invention, the network 140 is an Ethernet network. In an exemplary embodiment consistent with the present invention, the HSA is designed to work with the Ethernet network 140 and at layer-2. HSA may use the Ethernet network 140 as a black box for forwarding. This not only allows compatibility with existing Ethernet-based networks, but also decouples network service provisioning from network forwarding. In an exemplary embodiment consistent with the present invention, the HSA allows the set of middleboxes 145 to be distributed anywhere in the network 140. That is, the set of middleboxes 145 need not be physically located between the source host 105 and the destination host 110.

The agent 125 accepts packets from hosts such as source host 105 and determines a sequence of middleboxes to be traversed by the packets. In an exemplary embodiment consistent with the present invention, agents (for example, agent 115 and agent 120) may be situated at hosts (for example, at source host 105 and at destination host 110) in the network. Such an arrangement allows the agents to intercept the outgoing traffic transparently, and forward it to the appropriate first hop middlebox.

In an exemplary embodiment consistent with the present invention, the agent 125 may be implemented as a kernel module and inserted into a protocol stack of a host or implemented in hardware using, for example, NetFPGA. (See, e.g. Netfpga, http://www.netfpga.org, (Accessed January 2010), incorporated herein by reference.) In an exemplary embodiment consistent with the present invention, the agent 125 may be incorporated in a hypervisor (a virtualization technique that allows multiple guest operating systems (OS) to run concurrently on a host computer) such that guest OS is not aware of the agent 125 while their traffic is being secured according to the network security policy. The agent 125 in the hypervisor may also protect traffic between virtual machines residing in the same host.

The first ARP server 130 and the second ARP server 135 assist in finding a Media Access Control (MAC) address of at least one of the source host 105, the agent 125, the destination host 110, and/or one or more of middleboxes in the set of middleboxes 145. In an exemplary embodiment consistent with the present invention, at least one of the first ARP server 130 and the second ARP server 135 provides three main functions including, but not limited to: (1) providing ARP resolutions; (2) assisting in forwarding table updates in agents and middle boxes; and (3) monitoring a liveness of middleboxes and agents. Upon booting up, the first ARP server 130 and the second ARP server 135 register with a centralized controller (not shown) in the network 140 and an initial list of agents, hosts and middleboxes is provided to the first ARP server 130 and/or the second ARP server 135 by the centralized controller. As new agents, middle boxes and hosts join the network 140 and report to the centralized controller, the new entries are pushed to the first ARP server 130, and/or the second ARP server 135. In addition, the first ARP server 130, and/or the second ARP server 135 may maintain MAC addresses of agents and middle boxes. In an exemplary embodiment consistent with the present invention, multiple ARP servers, such as the first ARP server 130 and the second ARP server 135, may be distributed in the network 140 to provide fault tolerance and load balancing. The agents (such as agent 115, agent 120, and agent 125) and middle boxes (such as set of middleboxes 145) obtain a list of ARP servers in the network during their initial registration with the centralized controller.

In some exemplary embodiments consistent with the present invention, the middleboxes in the set of middleboxes 145 may be implemented in hardware, software, or a combination of both. In some exemplary embodiments consistent with the present invention, the set of middleboxes 145 may include a plurality of instances of a middlebox implemented in software. In some exemplary embodiments consistent with the present invention, the non-forwarding network service provided by each of the middleboxes includes, but is not limited to, traffic monitoring, traffic engineering, traffic policing, deep packet inspection (DPI), load balancing, network and system security enforcements such as firewall, network address translation, signature management for intrusion detection systems, and multimedia buffer management. In some exemplary embodiments consistent with the present invention, the source host 105 and/or the destination host 110 may include, but is not limited, to a laptop computer, desktop computer, a tablet computer, a server, a router, a mobile phone, or any other device that has computing and networking capabilities.

§4.2 EXEMPLARY APPARATUS

Embodiments consistent with the present invention might be implemented in hardware, such as one or more field programmable gate arrays ("FPGAs"), one or more integrated circuits such as an application specific integrated circuit ("ASICs"), one or more network processors, etc. Alternatively, or in addition, embodiments consistent with the present invention might be implemented as stored program instructions executed by a processor.

Such hardware and/or software might be provided in an addressed data (e.g., packet, cell, etc.) forwarding device (e.g., a switch, a router, etc.), a laptop computer, a desktop computer, a tablet computer, a mobile phone, or any device that has computing and networking capabilities.

Figure 2:
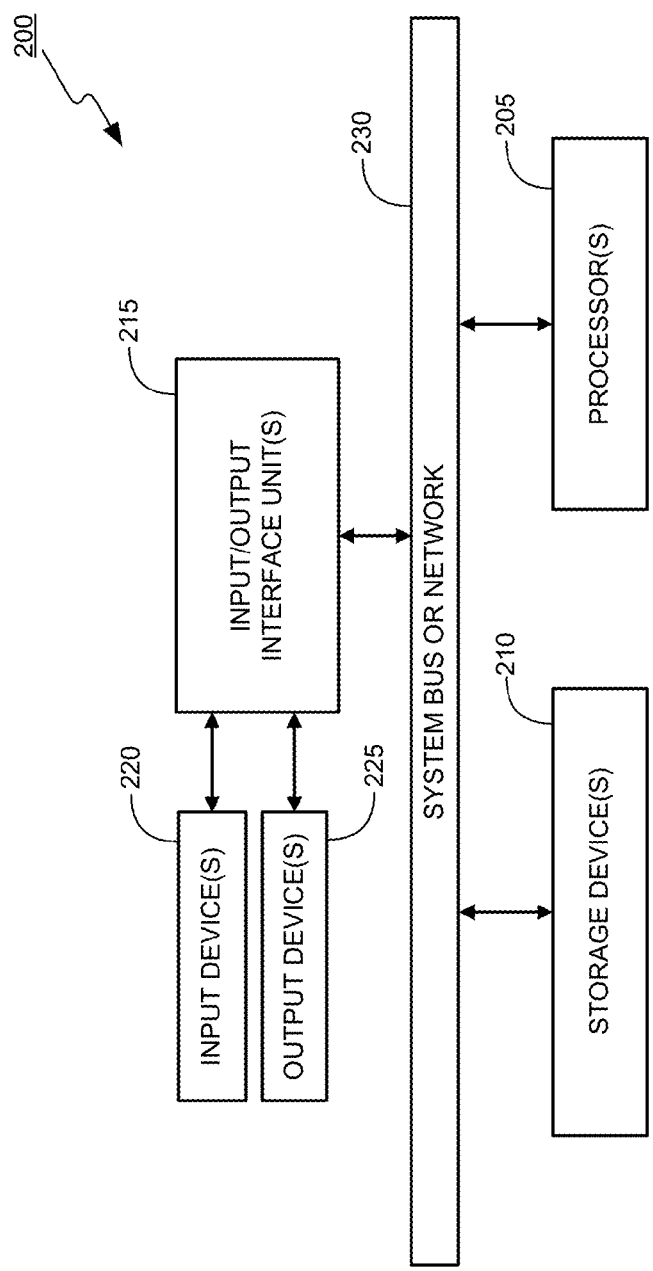
FIG. 2 is a block diagram of an exemplary apparatus that may perform various operations, and store various information generated and/or used by such operations, in a manner consistent with the present invention.

FIG. 2 is a block diagram of an exemplary machine 200 that may perform one or more of the processes described, and/or store information used and/or generated by such processes. The exemplary machine 200 includes one or more processors 205, one or more input/output interface units 215, one or more storage devices 210, and one or more system buses and/or networks 230 for facilitating the communication of information among the coupled elements. One or more input devices 220 and one or more output devices 225 may be coupled with the one or more input/output interfaces 215. The one or more processors 205 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 210 and/or may be received from an external source via one or more input interface units 215.

In some embodiments consistent with the present invention, the processors 205 may be one or more microprocessors. The bus 230 may include a system bus. The storage devices 210 may include system memory, such as read only memory (ROM) and/or random access memory (RAM). The storage devices 210 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

Some embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, the instructions and/or parameter values for implementing one or more aspects of the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

§4.3 EXEMPLARY METHODS FOR PROVISIONING MIDDLEBOXES DYNAMICALLY

FIG. 3, which includes FIGS. 3A and 3B, is a flow diagram of an exemplary method 300 for provisioning middleboxes in a network dynamically, in a manner consistent with the present invention. The method 300 may be used in an environment such as the environment 100 described above with reference to FIG. 1. At block 305, a data packet having a payload and a packet header including an Ethernet header identifying a source address and destination address is received by an agent in the network. At block 310, the agent, using the payload information and/or the packet header, determines a traffic type of the data packet. In an exemplary embodiment consistent with the present invention, the traffic type includes, but is not limited to Internet Protocol (IP) version 4, IP version 6, ARP, Reverse ARP, Apple Talk, Novell, MAC control, Multiprotocol Label Switching (MPLS) unicast, MPLS multicast and CobraNet. At block 315, the agent selects, based on the traffic type determined, a layer-2 forwarding information which encodes a set of one or more non-forwarding network service provider middleboxes in the network to be traversed by the data packet. At block 320, the agent inserts the layer-2 forwarding information into the Ethernet header of the data packet to generate a modified Ethernet header. In an exemplary embodiment consistent with the present invention, the agent inserts the layer-2 forwarding information ahead of a type field in the Ethernet header and the type field is updated to reflect the inserted layer-2 forwarding information. At block 325, the data packet having the modified Ethernet header is forwarded to the network such that the data packet will then traverse the one or more middleboxes, wherein a non-forwarding service will be provided by each of the one or more middleboxes on the data packet, in a sequence (defined by the sequence of middleboxes traversed).

After the data packet is forwarded to the network, at block 330, the non-forwarding service is performed by each of the one or more middleboxes. In addition to performing a service associated with the current middlebox (block 335), the act of performing the non-forwarding service further includes (i) obtaining, using the layer-2 forwarding information, a MAC address of the next middlebox in sequence to be traversed (block 340), (ii) updating the destination address in the modified Ethernet header of the data packet to the MAC address of the next middlebox in the sequence to generate an updated modified Ethernet header (block 345), and (iii) forwarding the data packet, using the destination address in the updated modified Ethernet header, to the next middlebox in the sequence (so that the next middlebox will be able to perform the non-forwarding network service associated with the next middlebox) (block 350).

At node 355, it is determined whether the current middlebox being traversed by the data packet is a last middlebox of the sequence. Responsive to the determination that the current middlebox is not the last middlebox in the sequence, the control is transferred to block 330. Referring again to node 355, responsive to the determination that the current middlebox is the last middlebox in the sequence, at block 360, a MAC address of the destination host to which the data packet is to be transmitted is obtained. At block 365, the destination address in the updated modified Ethernet header is updated with the MAC address of the destination host. At block 370, the layer-2 forwarding information from the updated modified Ethernet header is removed. At block 375, the data packet is forwarded to the destination host and the method 300 is left at return node 380.

Referring back to block 315, in an exemplary embodiment consistent with the present invention, the layer-2 forwarding information may include a label that encodes a set of one or more middleboxes to be traversed by the data packet. In an exemplary embodiment consistent with the present invention, labels are created by a centralized controller in the network, which is aware of the network topology. In some exemplary embodiments consistent with the present invention, the label may be 2-bytes. The centralized controller creates one or more labels encoding one or more sets of one or more middleboxes. In at least one exemplary embodiment consistent with the present invention, a set of one or more middleboxes is encoded based on a non-forwarding network service provided by each of the one or more middleboxes in the network. For example, assume that S1, S2 and S3 are three different non-forwarding network services to be performed on a data packet. Also assume that the M1, M2, M3 and M4 are four middleboxes in the network, where M1 provides services S1, S3; M2 provides services S2, S3; M3 provides service S1; and M4 provides service S2. Labels that may be created to encode the three services S1, S2, and S3 include L1=(M1, M2); L2=(M3, M2); L3=(M3, M4, M1); L4=(M1, M2, M1) etc., where L1, L2, L3, L4 are labels encoding 4 different sets of middleboxes. The data packet may be assigned one of these four labels. In some exemplary embodiments consistent with the present invention, more sequences (and therefore labels) may be created if the order of the services to be provided on the data packet is to be considered and encoded. (In this example, first S1, then S2 and finally S3.) Factors that may be considered by the centralized controller to create sequences of middleboxes include, but are not limited to (i) a proximity of a middlebox to a source host, and/or destination host, (ii) congestion (current and/or anticipated) at one or more middleboxes, and (iii) a load (current and/or anticipated) on one or more of middleboxes.

Referring back to block 320, after the label is inserted into the Ethernet header of the data packet, the agent updates the destination address in the Ethernet header with a MAC address of a first middlebox in the sequence.

Referring back to block 330, in some exemplary embodiments consistent with the present invention, the agent maintains in a table, a mapping of the traffic type of the data packet to labels, sequences, and/or middleboxes. In such embodiments, the agent may refer to this table to assign the layer-2 forwarding information to the data packet. In some exemplary embodiments consistent with the present invention, a middlebox has a forwarding table mapping labels of the sequences of which the middlebox is a part to a MAC address of the next middlebox in the sequence. In some embodiments consistent with the present invention, the forwarding tables in the middlebox may be indexed by the layer-2 forwarding information. When the data packet arrives at the middlebox, the middlebox can refer to this forwarding table to obtain the MAC address of the next middlebox in the sequence.

Referring back to block 355, the current middlebox may determine that it is the last middlebox of the sequence encoded by the layer-2 forwarding information if it does not find a MAC address of the next middlebox (in the sequence) in the forwarding table.

Referring back to block 360, the last middlebox in the sequence may obtain the MAC address of the destination host by submitting a request, using an IP address of the destination host in the 5-tuple TCP/IP header of the data packet, to an ARP server for the MAC address of the destination host. In such a case, the ARP server responds to the request by sending the MAC address of the destination host to the last middlebox.

§4.3.1 Discovering the Agent

Referring back to block 305, in at least some exemplary embodiments consistent with the present invention, the agent, which receives the data packet from a source host in the network may be discovered using an exemplary method 400 of FIG. 4. At block 405, the source host (from which the data packet is to be transmitted to the destination host) sends a request for a MAC address of the destination host, using a unicast ARP, to an ARP server in the network. At block 410, the ARP server responds to the request by sending a MAC address of an agent to the source host. In some embodiments consistent with the present invention, the source host may cache the MAC addresses of the agents received by the ARP server, in a local cache. In such embodiments, the source host may obtain the MAC address of the agents from the local cache instead of sending the request to the ARP server. At block 415, the source host updates the destination address in the Ethernet header of the data packet to the MAC address of the agent. At block 420, the source host forwards the data packet to the agent and the method 400 is left at return node 425. In an embodiment consistent with the present invention, when the agent receives the data packet from the source host, it may optionally verify the authenticity of the source host.

§4.3.2 Updating a Middlebox Traversal Sequence

FIG. 5 is a flow diagram of an exemplary method 500 for updating a middlebox traversal sequence, in a manner consistent with the present invention. At block 505, it is determined whether a new set of one or more middleboxes is to be associated with one or more labels. In some exemplary embodiments consistent with the present invention, such determination may be based on the factors including, but not limited to: (i) a proximity of a middlebox to a source host and/or destination host; (ii) congestion (current and/or expected) at one or more middleboxes; (iii) a load (current and/or expected) on one or more of middleboxes; (iv) addition of a new instance of the one or more middleboxes; (v) addition of a new middlebox; (vi) removal of an existing instance of the one or more middleboxes; and (vii) removal of an existing middlebox. At block 510, responsive to a determination that the new set of middleboxes are to be traversed, new layer-2 forwarding information encoding the new set of one or more middleboxes to be traversed is created. At block 515, the new layer-2 forwarding information is transmitted to each of the one or more middleboxes that are part of a sequence defined by the new layer-2 forwarding information (so those middleboxes can perform 330, 355, and 360 of FIG. 3). The method 500 is left at return node 520. In some exemplary embodiments consistent with the present invention, the determination of whether the new sequence has to be created and the creation of the new layer-2 forwarding information is performed by the centralized controller in the network. The centralized controller transmits the updates including new layer-2 information to ARP server(s) in the network, which in turn transmits the updates to the agent(s), which in turn transmits the updates to the one or more middleboxes.

§4.3.3 Middlebox Routing

FIG. 6 illustrates a graph 600 of middleboxes in an exemplary network. The graph 600 illustrates a set of middleboxes including a set of a first type middlebox ($I_{1,x}$) 615, a set of a second type middlebox ($I_{2,y}$) 620, a set of a third type middlebox ($I_{3,z}$) 625, and a set of a fourth type middlebox ($I_{4,n}$) 630. The graph 600 includes more than one middlebox of each type. For example, the first type middlebox ($I_1$) 615 may have "x" number of middleboxes, for example, ($I_{1,1} \ldots I_{1,x}$). Each of the "x" number of middleboxes may be implemented in software and/or hardware. Further, one or more of the "x" middleboxes may be a plurality of instances of a software-based middlebox. A data packet from the source host 605 directed to the destination host 610 may traverse through one or more of the set of middleboxes including first type middlebox 615 ($I_{1,x}$), second type middlebox ($I_{2,y}$) 620, third type middlebox ($I_{3,z}$) 625, and fourth type middlebox ($I_{4,n}$) 630.

Recall from FIG. 1 that middleboxes may be distributed in the network. Given a required sequence of middleboxes to be traversed, the exact middleboxes to be traversed (network service routing) may be determined with less constraints when service routing is independent (decoupled) from network forwarding. The middleboxes including first type middlebox 615 ($I_{1,x}$), second type middlebox ($I_{2,y}$) 620, third type middlebox ($I_{3,z}$) 625, and fourth type middlebox ($I_{4,n}$) 630 are interconnected by a generic Ethernet network 635. Thus graph 600 is a mesh adjacency between the middleboxes. That is, for a middlebox sequence ($I_{1,x}, I_{2,y}, I_{3,z}$), a valid route may include L1=(source host, $I_{1,x}, I_{2,y}, I_{3,z}$, destination host). The graph 600 is a directed graph with first type middlebox 615 having edges to second type middlebox 620, which in turn have edges to third type middlebox 625, which in turn have edges to fourth type middlebox 630. The graph 600 may represent all possible paths that satisfy the required sequence ($I_{1,x}, I_{2,y}, I_{3,z}$). Further, in some exemplary embodiments consistent with the present invention, a non-negative cost may be assigned to each of the edges and a shortest path between the source host 605 and the destination host 610 and including a correct sequence of middleboxes may be calculated using known algorithms such as, for example, Dijkstra's algorithm.

Alternatively or in addition, a dynamic programming approach may be used to calculate the paths. Given a sequence, candidate paths may be calculated from each first hop middlebox to the pseudo-destination. One of the first hop middleboxes (from an agent) is chosen based on edge costs. In an embodiment consistent with the present invention, the exact metric of cost may depend on the underlying forwarding fabric of the network and an optimization objective of the network operator. For example, factors including, but not limited to, latencies from one middlebox to another and proximity between middleboxes may be used as cost. However, the ability to determine sequences of middleboxes may be independent of the actual metric. The metric may be used in determining the sequences of middleboxes as long as a value is available. This preserves the ability to decouple the network service and network forwarding, thereby allowing separate optimizations for different goals (i.e. for goals for middlebox traversal and for traffic forwarding efficiency).

The sequences may be updated periodically to reflect changes in the edge costs or network topology.

§4.3.4 Alternatives, Refinements and Extensions

Although the layer-2 forwarding information, which encodes a set of one or more non-forwarding middleboxes is represented using a label, such information may be represented differently. For example, other exemplary embodiments consistent with the present invention, the layer-2 forwarding information may be represented using a bitmap. In one such alternative embodiment, the bitmap is 2 bytes (2 octets or 16 bits wide). The 16-bit layer-2 forwarding information may be configured to support bitmap-based routing, wherein b(i)=1, indicates that a middlebox of type "i" is to be traversed.

An example of bitmap routing is described with reference to graph 600 of FIG. 6. For example, consider a bitmap, b={0101 0000 0000 0000}. The bitmap b, where b(2)=1 and b(4)=1 indicates that a middlebox of type 2 and type 4, respectively, are to be traversed. That is, second type middlebox ($I_2$) 620 and fourth type middlebox ($I_4$) 630 are to be traversed by the data packet. In an embodiment consistent with the present invention, second type middlebox ($I_2$) 620 and fourth type middlebox ($I_4$) 630 are to be traversed in that sequence. (However, in other embodiments, the sequence of middlebox type traversal may not matter, or at least might not matter in some instances.) Further, as illustrated in graph 600, each type of middlebox may have multiple instances. A particular instance of a middle box may be chosen for traversing based on one or more factors such as, for example, a load on an instance of the middle box.

In another exemplary embodiment consistent with the present invention, load balancing among the instances of the middleboxes may be performed by calculating a hash value based on the 5-tuple TCP/IP header of the data packet. For example, when the data packet arrives at a particular second type middlebox 620, ($I_{2,y}$), from an agent, the data packet may be forwarded to one of the N middlebox instances of fourth type middlebox ($I_4$) 630 based on the hash value. Since data packets from different data flows tend to have different 5-tuple TCP/IP headers (and hence, different hash values,) they are very likely to be distributed to a different instance of the fourth type middlebox ($I_4$) 630, thus achieving load balancing. Table 1 below illustrates a mapping of hash values to middlebox types.

TABLE 1

| Hash Values | MAC Address of Type "i" Middleboxes (next hop) |
|---|---|
| 0-63 | 01-23-45-67-89-ab |
| 64-127 | 01-25-45-67-89-aa |
| 128-191 | 01-23-45-67-89-cc |
| 192-255 | 01-23-45-67-89-53 |

In the above exemplary method, when a middlebox learns the bitmap of an arriving packet, it obtains the type (type "i") of the next-hop middlebox. The current middlebox maintains a list of type "i" middleboxes, from which it may randomly choose one as the next hop middlebox. The random choice may be made using a hash function. In an exemplary embodiment, the hash value may be from 0-255, which is evenly divided into four regions (each region represented by a row in Table 1), where each region may correspond to a MAC address of a specific type "i" middlebox. Naturally, other ways of assigning (e.g., randomly) a next middlebox of a certain type may be used instead.

§4.4 ILLUSTRATIVE EXAMPLES OF OPERATION

An example illustrating an exemplary method of dynamically provisioning hybrid middleboxes using HSA is now described with reference to FIGS. 7A-7C. FIG. 7A illustrates a table 702 indicating different labels (layer-2 forwarding information) 706, middlebox traversal sequences 708 and corresponding middlebox instances 710 associated with a particular traffic type 704. For example, label L1 indicates a middlebox traversal sequence (A, B, C) provisioned using middlebox instances (A1, B1, C1), respectively, while label L2 indicates a middlebox traversal sequence (A, B, C) provisioned using middlebox instances (A2, B2, C2), respectively. An agent may assign at least one of labels L1 and L2 to data packet with traffic type T1. In some exemplary embodiments consistent with the present invention, the labels L1 or L2 may be assigned based on factors including, but not limited to: (i) a proximity of middleboxes (A1, B1, C1) and (A2, B2, C2) to a source host and/or destination host, (ii) congestion at one or more middleboxes (A1, B1, C1) and (A2, B2, C2), and (iii) a load on one or more of middleboxes (A1, B1, C1) and (A2, B2, C2). In this illustrative example, it is assumed that the first agent 714 (See FIG. 7B.) chooses the sequence (A1, B1, C1), and therefore label L1 for traffic type T1.

FIG. 7B illustrates forwarding data packets 716 and 754, using the labels L1 and L3, respectively, to the network 760, such that the data packets 716 and 754 will then traverse one or more middle boxes. (A non-forwarding network service will be provided by each of the one or more middle boxes on the data packets 716 and 754 in a sequence.) A data packet 716 is to be transmitted from the first host 712 to a destination host 756. (Also, see 712, 716, and 756 of FIG. 7C.) The first host 712 sends a unicast ARP request to an ARP server 758 for obtaining a MAC address of the destination host 756. (Also, see 756 of FIG. 7C.) The ARP server 758 responds to the request by sending a MAC address of the first agent 714. The data packet 716 is then forwarded to the first agent 714 on the first host 712. In this example, the first agent 714 is executing on the first host 712. (In other embodiments consistent with the present invention, the first agent 714 may be situated on a different host in the network 760.) The first agent 714 executing on the first host 712 determines that a traffic type of the data packet 716 is T1. The first agent 714 has a forwarding table 718 that maps a traffic type to a label for the traffic type and a MAC address of a first middle box in the sequence encoded by the label. For example, the forwarding table 718 indicates that for a traffic type T1, the label is L1 and the MAC address of the first middle box in the sequence encoded by L1 is A1. The first agent 714 obtains label L1 and inserts it into an Ethernet header of data packet 716. (Also, see 714, 716 and 762 of FIG. 7C.) Further, the first agent 714 also updates a destination MAC address in the Ethernet header of the data packet 716 with the MAC address of the first middlebox A1 722. (Also, see 714, 716 and 762 of FIG. 7C.)

The first agent 714 forwards the data packet 716 having the label L1 and the destination MAC address A1 to the middle box A1 722. (Also, see 762 and 722 of FIG. 7C.) The middlebox A1 722 receives the data packet 716 and performs its non-forwarding network service on the data packet 716. In some exemplary embodiments consistent with the present invention, the non-forwarding network service provided by the middlebox A1 722 includes, but is not limited to, traffic monitoring, traffic engineering, traffic policing, deep packet inspection (DPI), load balancing, network and system security enforcements such as firewall, network address translation, signature management for intrusion detection systems, and/or multimedia buffer management. After performing its non-forwarding network service, the middlebox A1 722 obtains a MAC address of the next middlebox B1 726 in the sequence, encoded by L1, from forwarding table 720 using the label L1 as a key. The forwarding table 720 includes a label and a MAC address of the next middlebox in the sequence represented by the label. The middlebox A1 722 updates the destination address in the Ethernet header of the data packet 716 with the MAC address of the middlebox B1 726 and then forwards the data packet 716 to the middlebox B1 726. (Also, see 722, 764 and 726 of FIG. 7C.) Similarly, the middlebox B1 726 performs the non-forwarding network service on the data packet 716 and forwards it to the next middlebox C1 730 using the forwarding table 724. (Also, see 726, 766 and 730 of FIG. 7C.) When the middlebox C1 730 attempts to forward the data packet 716 to the next middlebox, it discovers that it is the last middlebox in the sequence encoded by L1 since it does not find a MAC address for the next middlebox in its forwarding table 728 for label L1. Therefore, it is determined that the data packet 716 is to be forwarded to the destination host 756. The middle box C1 730 sends, using a 5-tuple TCP/IP header of the data packet 716, an ARP request to ARP server 758 in the network 760. (Also, see 730 and 758 of FIG. 7C.) The ARP server 758 responds to the request by sending a MAC address of the destination host 756 to the middlebox C1 730. The middlebox C1 730: (1) updates the destination address in the Ethernet header with the MAC address of the destination host 756; (2) removes the label L1 from the Ethernet header of the data packet 716; and (3) forwards the data packet 716 to the destination host 756. (Also, see 730, 768 and 756 of FIG. 7C.)

Similarly, non-forwarding network services are provided to the data packet 754 of traffic type T2 traversing from the second host 752 to the destination host 756, via middle boxes, namely, middlebox A2 744, middlebox C2 738, and middlebox D1 734 as specified by label L3. The second host 752, middlebox A2 744, middlebox C2 738, and middlebox D1 734 transmit the data packet 754 to the destination host 756 by referring to forwarding table 748, forwarding table 746, forwarding table 736, and forwarding table 732, respectively. Of course, the destination host 756 to which data packet 754 is directed need not be the same destination host to which the data packet 716 is directed to. In both cases, the destination host 756 can receive the packet as if it were sent directly from the first host 712 or second host 752.

In some exemplary embodiments consistent with the present invention, the ARP server 758 may receive details such as labels, sequences, MAC addresses of agents (such as first agent 714 and second agent 750), middleboxes (such as middlebox A1 722, middlebox B1 726, middlebox C1 730, middlebox D1 734, middlebox C2 738, middlebox B2 742, and middlebox A2 744), and MAC addresses of hosts (such as the first host 712 and the second host 752) from a centralized controller (not shown) in the network 760. The ARP server 758 might retrieve (or receive) such details upon initialization. The agents and the middleboxes may obtain, upon initialization, a list of ARP servers in the network 760. The agents and the middleboxes may then retrieve (or receive) the information required for maintaining their respective forwarding tables (such as forwarding table 718, forwarding table 720, forwarding table 724, forwarding table 728, forwarding table 732, forwarding table 736, forwarding table 740, forwarding table 746, and forwarding table 748) from the ARP server 758. Whenever network topology changes, for example, due to an addition and/or removal of a host, a middlebox and/or an agent, such change may be reported to (or recognized by) the centralized controller, and the centralized controller may in turn push the updates to the ARP server 758. The ARP server 758 may then send the updates to the corresponding agents and middleboxes.

A new sequence of one or more middleboxes may be created or an existing sequence of middleboxes may be updated by adding and/or removing middleboxes to allow optimization for network overhead, latency and/or a load on middleboxes. When software-based middleboxes are used, new instances may be activated on-demand and new labels may be created to utilize these new instances. FIG. 8 provides an example 800 illustrating creation of a new middlebox traversal sequence (new label) in the context of the middleboxes provisioned in FIGS. 7A-7C. The label L3 in FIG. 7A defines a middlebox traversal sequence for traffic type T2. The middleboxes in the sequence defined by L3={A2, C2, D1}. (See table 702 of FIG. 7A.) Assume that middlebox C2 738, which provides services for data packets of traffic types T1 and T2, shows signs of being overloaded. A load monitoring daemon (not shown) in the network 760 may query a database (not shown) for the available capacities of active "Type C" middle boxes and determine that middlebox C1 730 has capacity to handle additional traffic. Thus, T2 traffic from the first host 712 or first agent 714 is remapped to use middlebox C1 730 by creating a new label L6={A2, C1, D1}. The label L6 780 is added to forwarding table 746 of middlebox A2 744, label L6 782 is added to forwarding table 728 of middlebox C1 730, and label L6 784 is added to forwarding table 732 of middlebox D1 734. Finally, forwarding table 718 of the first host 712 is updated to map label L6 786 for traffic type T2.

§4.5 CONCLUSION

As can be appreciated from the foregoing, exemplary embodiments consistent with the present invention provide methods and apparatus for dynamically provisioning hybrid (hardware-based and software-based) middleboxes anywhere in a communications network. Unlike the previously known methods, the exemplary methods (i) do not require the middleboxes to be physically placed in the path of data packets from a source host to a destination host, (ii) do not require any special network forwarding infrastructure, (iii) do not require reconfiguration in network forwarding upon changes in the operations, optimizations and traversal of middleboxes, (iv) allow a high degree of automation in managing and operating the middleboxes, (v) provide dynamic deployment and scalability, and (vi) decouple network forwarding and network services.

What is claimed is:

1. A computer-implemented method comprising:
 receiving, by an agent included in a computer system including one or more computers in a network, a data packet having a payload and a packet header including at least an Ethernet header identifying a source address and a destination address in the network;
 determining, with the agent and using at least one of the packet header and the payload, a traffic type of the data packet;
 selecting, with the agent and based on the traffic type determined, layer-2 forwarding information which encodes a set of one or more service provider middle boxes in the network to be traversed by the data packet, the service provider middle boxes providing non-forwarding network services, wherein the layer-2 forwarding information identifies a sequence of one or more middle box services to be applied to the data packet;

inserting, with the agent, the layer-2 forwarding information into the Ethernet header to generate a modified Ethernet header; and forwarding, with the agent and using the layer-2 forwarding information, the data packet having the modified Ethernet header to the network, such that the data packet will then traverse the set of one or more middle boxes, wherein a non-forwarding network service will be provided by each of the one or more middle boxes on the data packet in a sequence, wherein the layer-2 forwarding information is either:

(A) a label identifying a sequence of the one or more non-forwarding network service provider middle boxes to be traversed by the data packet, wherein if the layer-2 forwarding information is the label, the act of inserting the layer-2 information into the Ethernet header comprises inserting the label into the Ethernet header ahead of a type field in the Ethernet header; or (B) a bitmap identifying a sequence of the one or more middle box services to be applied to the data packet.

2. The computer-implemented method of claim 1, wherein the agent receives the data packet from a source host in the network.

3. The computer-implemented method of claim 2, wherein the act of receiving the data packet from the source host includes requesting, with the source host and using a unicast Address Resolution Protocol (ARP), from an ARP server in the network, a media access control (MAC) address of a destination host to which the data packet is directed in the network, sending, with the ARP server and responsive to the request, a MAC address of the agent to the source host, updating, with the source host, the destination address in the Ethernet header of the data packet to the MAC address of the agent, and forwarding, with the source host, the data packet to the agent.

4. The computer-implemented method of claim 1 further comprising:

performing the non-forwarding network service provided by each of the one or more middle boxes on the data packet in a sequence by obtaining, using the layer-2 forwarding information, a MAC address of next one of the one or more middle boxes in the sequence to be traversed, updating the destination address in the modified Ethernet header of the data packet to the MAC address of the next one of the one or more middle boxes to be traversed to generate an updated modified Ethernet header, and forwarding the data packet, using the destination address in the updated modified Ethernet header, to the next one of the one or more middle boxes in the sequence to perform the non-forwarding network service provided by the next one of the one or more middle boxes.

5. The computer-implemented method of claim 4, wherein each of the one or more middle boxes stores only the layer-2 forwarding information of which the middle box is a part and the MAC address of the next one of the one or more middle boxes in the sequence.

6. The computer-implemented method of claim 4 further comprising:

determining if a current middle box is a last middle box in the sequence to be traversed;

responsive to a determination that the current middle box is the last middle box in the sequence, obtaining a MAC address of a destination host to which the data packet is to be transmitted;

updating the destination address of the modified Ethernet header to the MAC address of the destination host;

removing the inserted layer-2 forwarding information from the modified Ethernet header; and forwarding the data packet to the destination host.

7. The computer-implemented method of claim 6, wherein the act of obtaining the MAC address of the destination host to which the data packet is to be transmitted includes requesting, with the last middle box and using a destination Internet Protocol (IP) address from an IP header in the packet header, from an ARP server in the network, the MAC address of the destination host, and transmitting, with the ARP server and responsive to the request, the MAC address of the destination host to the last middle box.

8. The computer-implemented method of claim 1, wherein the agent is implemented in software running on the one or more computers in the network.

9. The computer-implemented method of claim 1, wherein the one or more middle boxes are implemented in at least one of software running on the one or more computers in the network, hardware, or a combination of both.

10. The computer-implemented method of claim 9, wherein at least one of the one or more middle boxes implemented in software includes a plurality of instances.

11. The computer-implemented method of claim 1 further comprising:

determining if a new set of one or more middle boxes are to be traversed by the data packet;

responsive to a determination that the new set of one or more middle boxes are to be traversed, creating a new layer-2 forwarding information encoding the new set of one or more middle boxes to be traversed; and transmitting the new layer-2 forwarding information to each of the one or more middle boxes that is part of a new sequence defined by the new layer-2 forwarding information.

12. The computer-implemented method of 11, wherein it is determined that a new set of one or more middle boxes are to be traversed when at least one of (A) a new instance of the one or more middle boxes is created, (B) a new middle box is added, (C) an existing instance of the one or more middle boxes is removed, or (D) an existing middle box is removed.

13. The computer-implemented method of 11, wherein it is determined that a new set of one or more middle boxes are to be traversed when congestion of at least a determined amount is detected in a current set of the one or more middle boxes.

14. The computer-implemented method of claim 1, wherein the one or more middle boxes to be traversed by the data packet is represented as a graph $G=(I,N)$, where I is a type of one of the one or more middle boxes to be traversed, and N is an instance of the one of the one or more middle boxes of type I.

15. The computer-implemented method of claim 1, wherein the layer-2 forwarding information is the bitmap identifying a sequence of the one or more middle box services to be applied to the data packet, and wherein the layer-2 forwarding information is two bytes.

16. The computer-implemented method of claim 1, wherein the layer-2 forwarding information is the bitmap identifying a sequence of the one or more middle box services to be applied to the data packet, and wherein a bit, b(i)=1 in the bitmap indicates a middle box of type i is to be traversed by the data packet.

17. The computer-implemented method of claim 16 further comprising:
identifying, using a hash value of a TCP/IP header of the data packet, an instance N, of the middle box of type i to be traversed by the data packet.

18. The computer-implemented method of claim 1, wherein the act of forwarding the data packet having the modified Ethernet header to the network such that the data packet will then traverse the set of one or more middle boxes decouples the non-forwarding network services provided by the set of one or more middle boxes from network forwarding.

19. The computer-implemented method of claim 1, wherein the non-forwarding network services provided by the set of one or more middle boxes include one or more of traffic monitoring, traffic engineering, traffic policing, deep packet inspection, load balancing, network and system security enforcements, firewall, network address translation, signature management for intrusion detection systems, and multimedia buffer management.

20. Apparatus comprising:
a) at least one processor;
b) at least one input device; and
c) at least one storage device storing program instructions which, when executed by the at least one processor, performs a method including:
receiving, by an agent included in a computer system including one or more computers in a network, a data packet having a payload and a packet header including at least an Ethernet header identifying a source address and a destination address in the network;
determining, with the agent and using at least one of the packet header and the payload, a traffic type of the data packet;
selecting, with the agent and based on the traffic type determined, layer-2 forwarding information which encodes a set of one or more service provider middle boxes in the network to be traversed by the data packet, the service provider middle boxes providing non-forwarding network services, wherein the layer-2 forwarding information identifies a sequence of one or more middle box services to be applied to the data packet;
inserting, with the agent, the layer-2 forwarding information into the Ethernet header to generate a modified Ethernet header; and
forwarding, with the agent and using the layer-2 forwarding information, the data packet having the modified Ethernet header to the network, such that the data packet will then traverse the set of one or more middle boxes, wherein a non-forwarding network service will be provided by each of the one or more middle boxes on the data packet in a sequence,
wherein the layer-2 forwarding information is either:
(A) a label identifying a sequence of the one or more non-forwarding network service provider middle boxes to be traversed by the data packet, wherein if the layer-2 forwarding information is the label, the act of inserting the layer-2 information into the Ethernet header comprises inserting the label into the Ethernet header ahead of a type field in the Ethernet header; or
(B) a bitmap identifying a sequence of the one or more middle box services to be applied to the data packet.

21. An article of manufacture comprising:
a non-transitory machine-readable medium having instructions which, when executed by a machine, performs a method including:
receiving, by an agent included in a computer system including one or more computers in a network, a data packet having a payload and a packet header including at least an Ethernet header identifying a source address and a destination address in the network;
determining, with the agent and using at least one of the packet header and the payload, a traffic type of the data packet;
selecting, with the agent and based on the traffic type determined, layer-2 forwarding information which encodes a set of one or more service provider middle boxes in the network to be traversed by the data packet, the service provider middle boxes providing non-forwarding network services, wherein the layer-2 forwarding information identifies a sequence of one or more middle box services to be applied to the data packet;
inserting, with the agent, the layer-2 forwarding information into the Ethernet header to generate a modified Ethernet header; and
forwarding, with the agent and using the layer-2 forwarding information, the data packet having the modified Ethernet header to the network, such that the data packet will then traverse the set of one or more middle boxes, wherein a non-forwarding network service will be provided by each of the one or more middle boxes on the data packet in a sequence,
wherein the layer-2 forwarding information is either:
(A) a label identifying a sequence of the one or more non-forwarding network service provider middle boxes to be traversed by the data packet, wherein if the layer-2 forwarding information is the label, the act of inserting the layer-2 information into the Ethernet header comprises inserting the label into the Ethernet header ahead of a type field in the Ethernet header; or
(B) a bitmap identifying a sequence of the one or more middle box services to be applied to the data packet.

* * * * *